L. W. YOUNG.
HATCH FASTENER.
APPLICATION FILED MAR. 5, 1908.
976,974.
Patented Nov. 29, 1910.
3 SHEETS—SHEET 2.
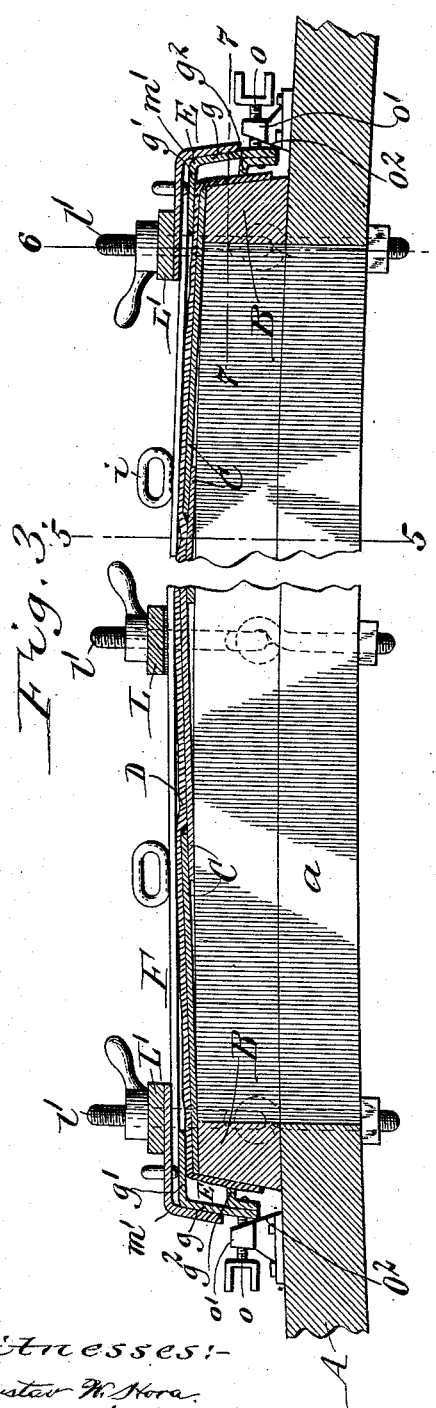
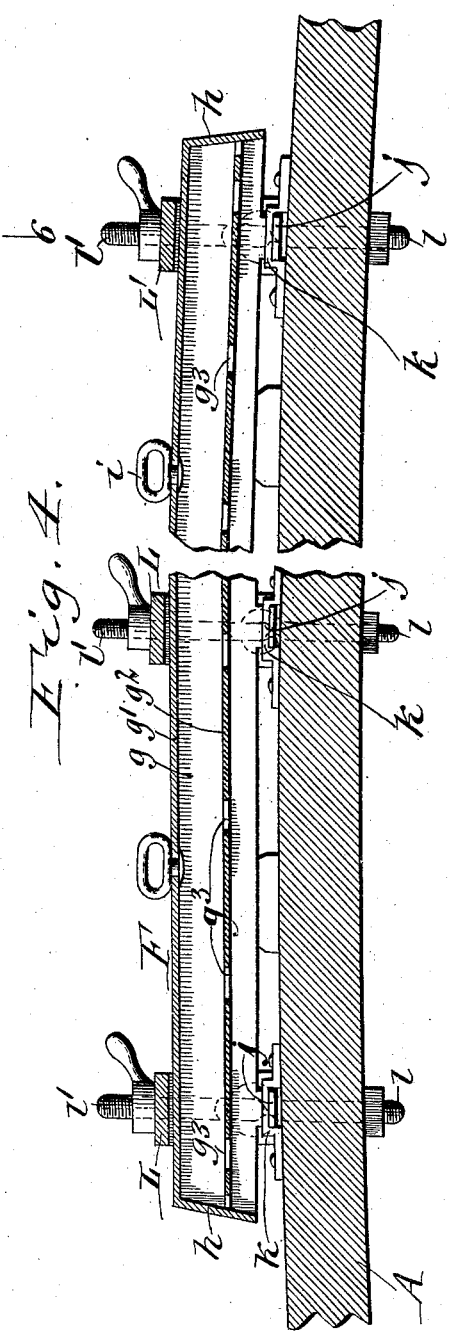
Witnesses:—
Gustav W. Hora.
Richard Sommer.
Inventor
Lucious W. Young
by Geyer & Papp
Attorneys.

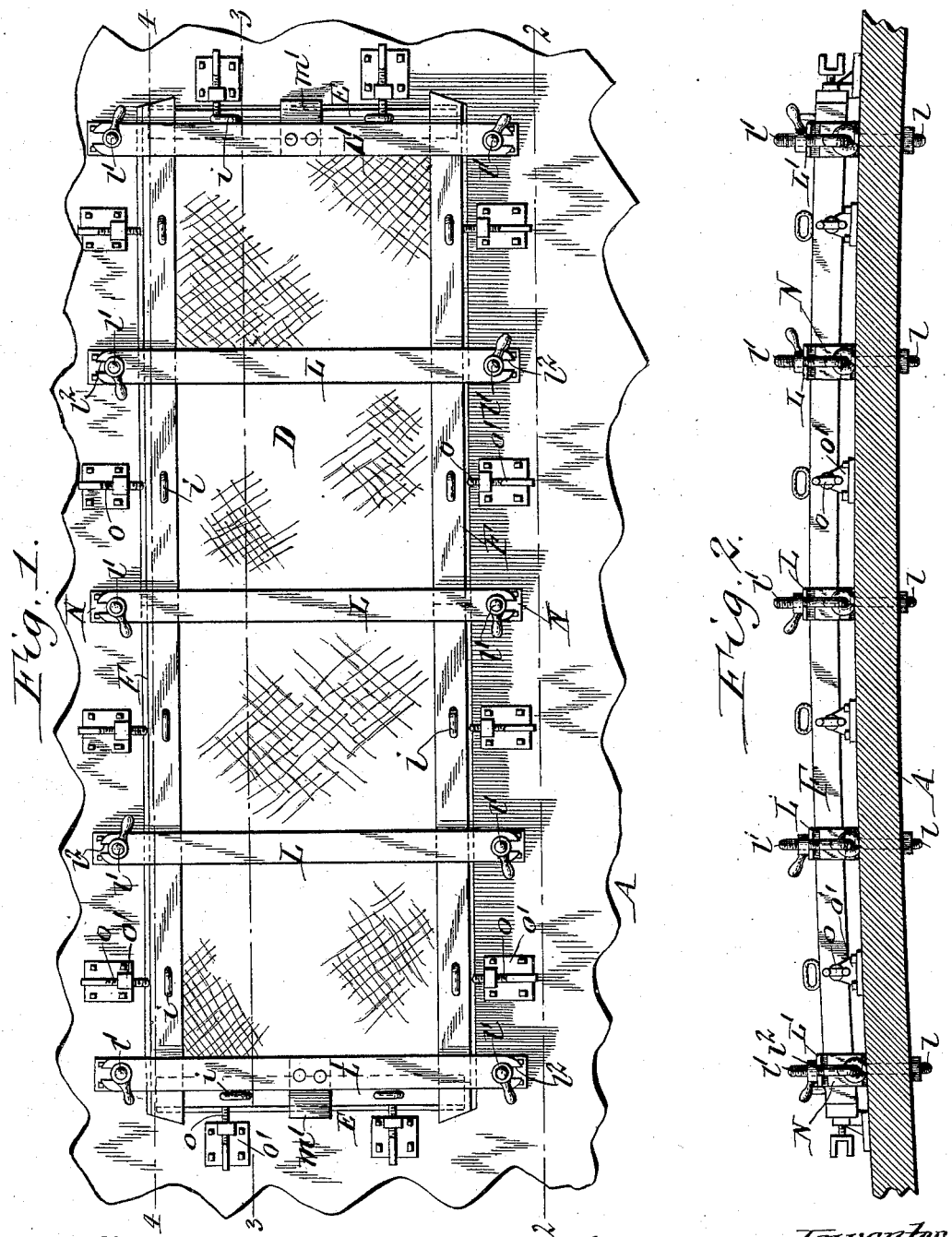

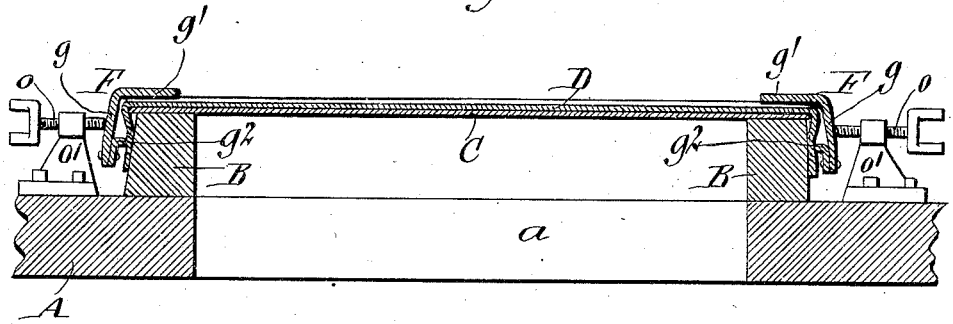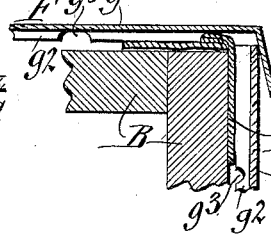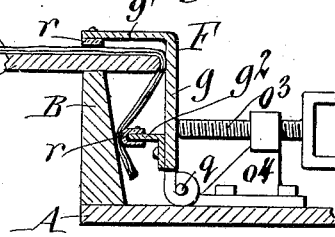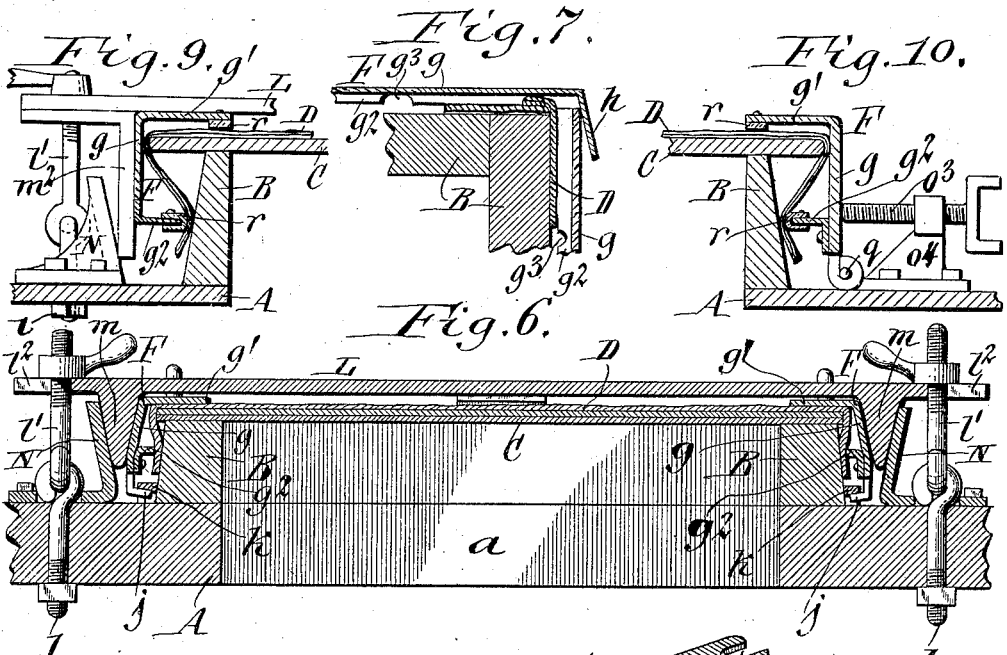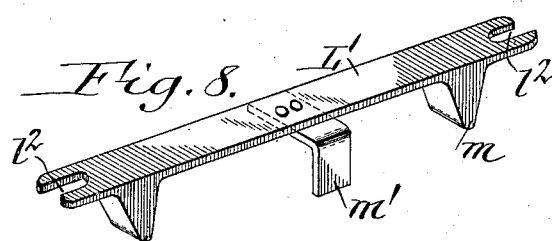

UNITED STATES PATENT OFFICE.

LUCIOUS W. YOUNG, OF TONAWANDA, NEW YORK, ASSIGNOR OF ONE-FOURTH TO JOHN T. KINNEY AND ONE-FOURTH TO WILLIAM J. KINNEY, OF BUFFALO, NEW YORK.

HATCH-FASTENER.

976,974.     Specification of Letters Patent.     Patented Nov. 29, 1910.

Application filed March 5, 1908. Serial No. 419,240.

*To all whom it may concern:*

Be it known that I, LUCIOUS W. YOUNG, a citizen of the United States, and residing at Tonawanda, in the county of Erie and State of New York, have invented a new and useful Improvement in Hatch-Fasteners, of which the following is a specification.

This invention relates to a hatch fastener whereby the covers are held in place over the hatchways of vessels.

The object of this invention is to provide a fastener for this purpose which is simple in construction, which can be quickly and easily applied to or removed from the hatch, and which holds the hatch cover reliably in place.

In the accompanying drawings consisting of 3 sheets: Figure 1 is a top plan view of one form of my improved hatch fastener. Fig. 2 is a section of the deck taken in line 2—2, Fig. 1, and showing one of the longitudinal sides of the hatch fastener. Fig. 3 is a fragmentary vertical longitudinal section of the hatch fastener, on an enlarged scale, in line 3—3, Fig. 1. Fig. 4 is a similar view taken in line 4—4, Fig. 1. Fig. 5 is a vertical transverse section, on an enlarged scale, of the hatch fastener taken in line 5—5, Fig. 3. Fig. 6 is a similar view taken in line 6—6, Fig. 3. Fig. 7 is a fragmentary horizontal section of one corner of the hatch fastener taken in line 7—7, Fig. 3. Fig. 8 is a perspective view of one of the transverse tie bars of the hatch fastener. Figs. 9 and 10 are fragmentary vertical sections showing different forms of my improved hatch fastener.

Similar letters of reference indicate corresponding parts throughout the several views.

A represents the deck of a ship, $a$ one of the hatchways therein, and B the upwardly projecting combing arranged on the deck around the hatchway.

C represents the shingles or cover plates which are arranged transversely upon the combing so as to close the hatchway and have their adjacent transverse edges overlapping one another and D the flexible waterproof cover sheet or tarpaulin which is placed over the hatch plates or shingles and hangs with its marginal part downwardly along the outer sides of the combing.

My improved fastening whereby the tarpaulin and cover plates are held in place over the hatchway is constructed as follows: Referring to Figs. 1–8, E, E represent two transverse or end clamping bars whereby the end edges and the end plates of the hatch cover are held in place and F, F two longitudinal or side clamping bars whereby the side edges of the tarpaulin and the cover plates are held in place. Each of these clamping bars is provided with an upright web $g$ having an upper inwardly projecting horizontal flange or a jaw $g^1$ which is comparatively wide and adapted to overlap the marginal part of the tarpaulin and the cover plates resting on the combing and a lower inwardly projecting horizontal flange or jaw $g^2$ adapted to engage with the depending marginal portion of the tarpaulin and press the same against the outer side of the combing, as shown in Fig. 3. Each of the lower jaws or flanges of the clamping bars is provided with notches or openings $g^3$ which permit the escape of any water which may get in between the upper and lower jaws of said bars.

In fastening the hatch cover the end clamping bars are first engaged with the end portion of the tarpaulin and cover plates and then the side clamping bars are engaged with the side portions of the tarpaulin and plates. In order to prevent the end clamping bars from being disengaged from the tarpaulin and cover plates while the side clamping bars are in place each of the latter is provided at its opposite ends with inwardly turned lips $h$, each of which is adapted to engage with the outer side of the adjacent end of an end clamping bar, as shown in Fig. 7. Each of these lips is inclined somewhat as shown in said figure so that upon moving the side clamping bar which carries the same inwardly this lip upon engaging the respective end of the end clamping bar will operate upon the latter with the cam or wedge action and thus produce the effect of tightening the respective end clamping bar against the hatch cover. Each of the clamping bars is preferably provided with one or more handles $i$ for convenience in moving the same into or out of its operative position.

If desired, the clamping bars may each be provided with a plurality of depending hooks $j$ the bills of which project inwardly and engage with loops $k$ secured to the deck, as shown for instance on the longitudinal clamping bars. The coöperating sides or faces of the hooks $j$ and the loops $k$ are preferably inclined so that upon moving the clamping bars toward the combing they will be drawn downwardly, thereby causing the clamping bars to press firmly inward and downward on the hatch cover and secure the same reliably to the combing. When the clamping bars are not in use they may be readily detached from the loops $k$ and laid out of the way.

L, $L^1$ represent a plurality of transverse tie bars which form part of the means whereby the clamping bars are held in place. These tie bars are arranged at suitable intervals transversely over the hatch cover and each projects at its opposite ends beyond the outer side of the side clamping bars. Various means may be employed for detachably connecting the tie bars with the deck and holding the same in place over the hatch cover and clamping bars. The means for this purpose shown in the drawings are preferred and consist of eye bolts $l$ secured to the deck and swivel bolts $l^1$ pivoted at their lower ends to the eye bolts and capable of being swung into and out of notches $l^2$ in the ends of the tie bars and engaging with their screw nuts against the upper side of the tie bars, as shown in Figs. 1, 2, 3, 4 and 6. Near its opposite ends each of the tie bars is provided with depending presser fingers or lugs $m$ each of which is adapted to engage with its inner side against the outer side of the adjacent side clamping bar. For the purpose of enabling these fingers to engage effectively with the clamping bars, brackets, standards or abutments N are arranged on the decks in position to be engaged by the outer sides of the fingers $m$. Each of the presser fingers preferably tapers downwardly and the coöperating inner side of the bracket or abutment and the outer side of the side clamping bar converge downwardly, as shown in Fig. 6, whereby the fingers upon moving downwardly between the bracket and side clamping bar operate as wedges, whereby the side clamping bars are firmly pressed against the hatch cover and reliably hold the same in place over the hatchway.

The endmost tie bars $L^1$ are provided on their central parts with depending inclined presser fingers $m^1$ which are adapted to engage with the central part of the outer sides of the end clamping bars and assist in holding the same firmly against the hatch covering, as shown in Figs. 1, 3 and 8.

For the purpose of further securing the clamping bars against the hatch covering, the outer sides of the clamping bars are engaged by horizontal clamping screws $o$ which work in standards or brackets $o^1$ arranged on the deck adjacent to the outer side of the clamping bars, as shown in Figs. 1–5. When such additional fastenings are employed for the longitudinal clamping bars, the brackets or abutments $o^1$ thereof are separated a sufficient distance from said bars to permit the hooks $j$ of the latter to be freely attached to and detached from the loops $k$. As shown in Fig. 3, the hook and loop connections between the transverse clamping bars and the deck are omitted in which case the screw brackets $o^1$ are arranged closer to these clamping bars and the latter engage at their lower edges with the inclined inner sides $o^2$ of these brackets, whereby the end clamping bars when pressed downwardly are also pressed laterally against the combing.

If desired, the hook and loop connection may be omitted between the longitudinal clamping bars and the deck and the presser fingers $m^2$ on the tie rods may be made straight, as shown in Fig. 9. The clamping bars may also be pivotally connected with the deck by a hinge $g$ and held against the cover on the combing by a screw $o^3$ working in a bracket or standard $o^4$ on the deck, as shown in Fig. 10. If desired, the edges of the jaws or flanges of the clamping bars may be faced with rubber $r$, as shown in Figs. 9 and 10.

In the foregoing description and in the following claims the term cover refers more particularly to the main rigid cover plates C over which the flexible or auxiliary cover section or tarpaulin extends.

I claim as my invention:

1. A hatch fastener comprising longitudinal clamping bars adapted to engage with the longitudinal parts of the hatch cover and transverse clamping bars adapted to engage with the transverse parts of the same, the opposing ends of said longitudinal and transverse bars being constructed to interlock.

2. A hatch fastener comprising longitudinal clamping bars adapted to engage with the longitudinal parts of the hatch cover and transverse clamping bars adapted to engage with the transverse parts of the same, the opposing ends of said longitudinal and transverse bars being constructed to interlock by means of a lip arranged on one of said opposing members and engaging with the respective end of the other member.

3. A hatch fastener comprising longitudinal clamping bars adapted to engage with the longitudinal parts of the hatch cover and transverse clamping bars adapted to engage with the transverse parts of the same, the opposing ends of said longitudinal and transverse bars being constructed to interlock by means of an inclined lip arranged on one of said opposing members and engaging with the respective end of the other member.

4. A hatch fastener comprising clamping bars adapted to engage with the margin of the hatch cover, tie bars adapted to engage with the top of the clamping bars, and means for detachably connecting the tie bars with the deck.

5. A hatch fastener comprising clamping bars adapted to engage with the margin of the hatch cover, tie bars adapted to engage with the top of the clamping bars, and each provided at opposite ends with notches, and swivel bolts connected with the deck and adapted to engage with said notches of the tie bars.

6. A hatch fastener comprising clamping bars adapted to engage with the margin of the hatch cover, tie bars adapted to engage with the top of the clamping bars and provided with depending presser fingers adapted to engage with the outer sides of the clamping bars, and means for detachably connecting the tie bars with the deck.

7. A hatch fastener comprising clamping bars adapted to engage with the margin of the hatch cover, tie bars adapted to engage with the top of the clamping bars, and provided with depending presser fingers adapted to engage on their inner sides with the outer sides of the clamping bars, abutments secured to the deck and adapted to be engaged by the outer side of the presser fingers, and means for connecting the tie bars with the deck.

8. A hatch fastener comprising clamping bars adapted to engage with the margin of the hatch cover, tie bars adapted to engage with the top of the clamping bars and provided with depending presser fingers adapted to engage on their inner sides with the outer sides of the clamping bars, abutments secured to the deck and having an inclined inner side adapted to be engaged by the outer side of the presser fingers, and means for connecting the tie bars with the deck.

9. A hatch fastener comprising clamping bars adapted to engage with the margin of the hatch cover, abutments arranged on the deck adjacent to the clamping bars and having an inclined inner side, transverse tie bars engaging with the upper side of the clamping bars and having depending tapering fingers each adapted to engage with the inclined side of one of said abutments and the opposing side of the adjacent clamping bar, and means for connecting the tie bars with the deck.

10. A hatch fastener comprising longitudinal clamping bars adapted to engage with the longitudinal edges of the hatch cover, transverse clamping bars adapted to engage with the transverse edges of the same, transverse tie bars engaging with the upper sides of the longitudinal clamping bars and each having a depending finger adapted to engage with the outer side of the adjacent transverse clamping bar, and means for connecting the tie bars with the deck.

11. A hatch fastener comprising clamping bars adapted to engage with the margin of the hatch covers, and brackets or abutments arranged on the deck adjacent to the hatchway, and clamping screws arranged in said brackets and engaging with said clamping bars.

12. A hatch fastener comprising clamping bars adapted to engage with the margin of the hatch covers, loops arranged on the deck, hooks arranged on the clamping bars and adapted to engage with said loops, and means for holding said bars and hooks in engagement with the hatch cover and loops.

13. A hatch fastener comprising clamping bars adapted to engage with the margin of the hatch covers, loops arranged on the deck, hooks arranged on the clamping bars and adapted to engage with said loops, and means for holding said bars and hooks in engagement with the hatch cover and loops, said means consisting of brackets or abutments arranged on the deck, and screws arranged in said brackets and engaging with said clamping bars.

Witness my hand this 27th day of February, 1908.

LUCIOUS W. YOUNG.

Witnesses:
JOHN T. KINNEY,
THEO. L. POPP.